Sept. 20, 1955 D. F. COLLINS 2,718,029
AUTOCLAVE FOR VULCANIZING AUTOMOBILE MATS OR THE LIKE
Filed March 10, 1951 2 Sheets-Sheet 1
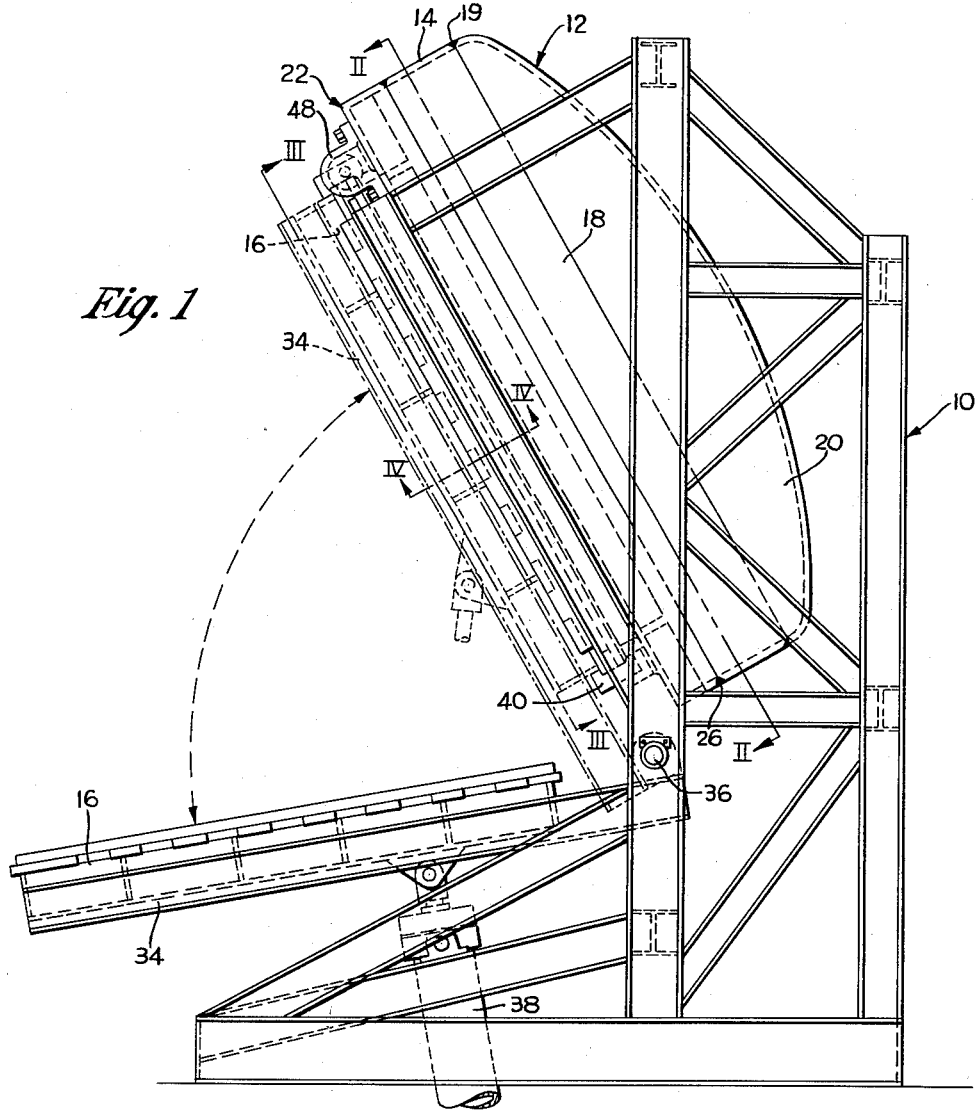
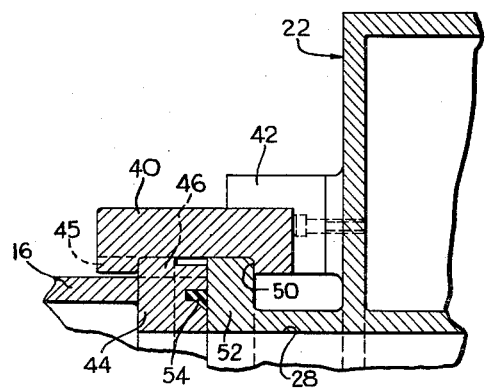
*INVENTOR.*
Don F. Collins
BY
Oldham & Oldham
ATTORNEYS Sept. 20, 1955 D. F. COLLINS 2,718,029
AUTOCLAVE FOR VULCANIZING AUTOMOBILE MATS OR THE LIKE
Filed March 10, 1951 2 Sheets-Sheet 2

INVENTOR.
Don F. Collins
BY Oldham & Oldham
ATTORNEYS ized Sept. 20, 1955

2,718,029

AUTOCLAVE FOR VULCANIZING AUTOMOBILE MATS OR THE LIKE

Don F. Collins, Akron, Ohio, assignor to Adamson United Company, Akron, Ohio, a corporation of Ohio Application March 10, 1951, Serial No. 214,975

1 Claim. (Cl. 18—17)

This invention relates to an autoclave or watch case heater apparatus for vulcanizing simultaneously a plurality of sheet-like materials, such as automats, and, more particularly, to an improvement and a simplification in the construction of such apparatus.

Substantially flat, sheet-like rubber bodies, for example, auto mats, have often been vulcanized, heretofore, in a pot heater, which is a long cylindrical vulcanizing chamber closed at one end and removably closed at the other by a door, a relatively large number of the auto mats carried by suitable molds being vulcanized simultaneously in the pot heater. However, with equipment of this type, there are problems and complications of loading and unloading the auto mats with respect to the pot heater, and with respect to applying the unvulcanized mats to the molds and in removing the vulcanized mats from the molds.

Because of these complications in the pot heater type of operation, apparatus has been proposed of the clam shell or watch case type, which might be described as a very short pot heater, and adapted to take, for example, up to one-half dozen automobile mats, rather than the several dozen or more mats usually vulcanized in a pot heater. The watch case heater or autoclave of known or proposed types is normally more expensive to construct on a per mat vulcanizing basis than is the pot heater equipment, although the watch case heater is recognized to be, in general, more efficient in operation, particularly with respect to the handling of the mats, the control of vulcanizing temperatures, and the like.

The relatively high cost of watch case heaters for vulcanizing automobile mats and similar articles has been due in part to complications of design arising because of the round body of the autoclave and because of the necessity for a door adapted to be removably sealed in association with the round body. For example, when a round door is employed, and in operations upon relatively square mats, during loading and unloading of the autoclave, it becomes necessary for the operator to reach across the arc of the door circle to handle mats whose edges lie on chords of the arc. With the equipment hot from the vulcanizing temperatures, this off-balance reach is definitely objectionable.

It is the general object of my invention to avoid and overcome the foregoing and other difficulties of and objections to known vulcanizing equipment for automobile mats and the like, by the provision of an improved autoclave or heater of the watch case type characterized by simplicity and inexpensiveness of construction, durability and long life, and by ease of operation and high efficiency.

Another object of my invention is to provide an autoclave of the type described having a simple cylindrical rolled plate body of welded steel, a rectangular door of fabricated steel, and a transition section of cast steel for joining the door to the cylindrical body.

Another object of my invention is the provision of an improved automatic mechanism for locking and unlocking a watch case heater door in association with the heater body.

Another object of my invention is the provision of an automobile mat vulcanizer in which loading and unloading of the mats is facilitated and simplified.

The foregoing objects of my invention, and other objects which will become apparent as the description proceeds, are achieved by an autoclave or heater of the watch case type having a cylindrical body portion of rolled and welded metal plate closed at one end by a dished shell of metal plate welded to the central portion of the body, a transition member of cast metal having a circular flange welded to the central portion of the body, the transition member having a rectangular opening, a rectangular door movable to and from the opening, and a plurality of clamp bars associated with the edges of the opening and movable to and from locking position between the transition member and the door.

For a better understanding of my invention, reference should be had to the accompanying drawings, wherein:

Fig. 1 is a side elevation of a watch case heater incorporating the principles of my invention;

Fig. 4 is an enlarged fragmentary cross-sectional view illustrating the details of the door-locking mechanism, and taken substantially on line IV—IV of Fig. 1.

Figure 2:
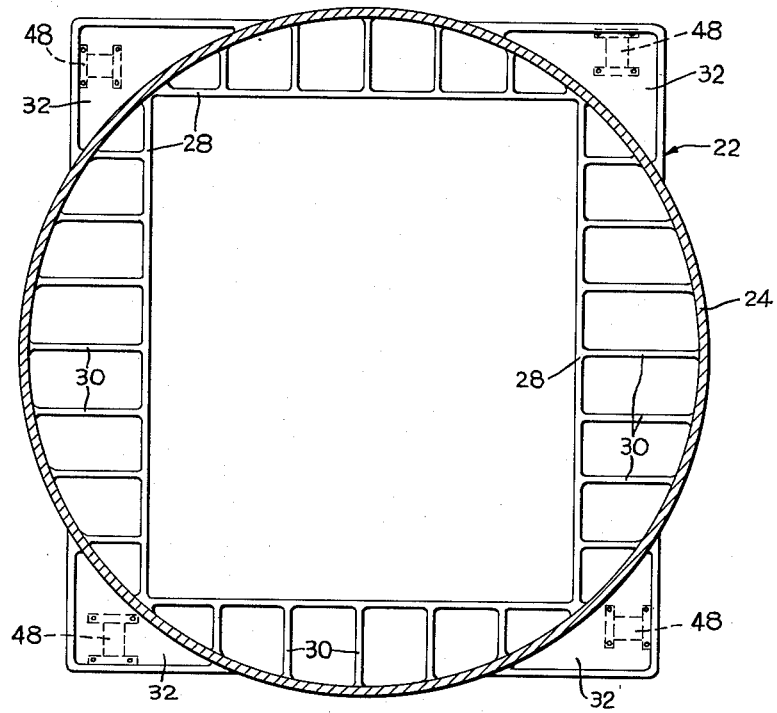
Fig. 2 is a transverse sectional view taken substantially on line II—II of Fig. 1.

In the drawings, the numeral 10 indicates generally a frame, which is conveniently made up from channel and I-beam sections of steel welded into the framework shown. The frame 10 carries in a forwardly and downwardly inclined position a watch case heater or autoclave, indicated generally by the numeral 12 and including a body portion 14 and a door 16.

The body portion 14 of the watch case heater includes a rolled metal plate 18, usually steel, welded to form a short cylindrical section to which is welded at 19 a dished metal plate 20, usually steel, forming the closed end of the heater.

Between the cylindrical body section 18 and the door 16 is what I call a transition section, indicated generally by the numeral 22, and it is the purpose of this transition section to provide for the removable but sealed relation of the substantially rectangular door 16 with the cylindrical body section 18. The transition section 22 comprises a cast metal member, usually cast steel, as best seen in Figures 1 and 2, having a circular flange 24 of the same diameter as the cylindrical section 18 of the body 14 of the heater, with the flange 24 and body section 18 being welded together, as at 26.

The transition section 22 includes a substantially rectangular opening 28 adapted to removably receive the door 16, and strengthening flanges 30 are provided on the transition section to strengthen it in the manner shown in Fig. 2. Also, the transition section 22 is formed with flanged corners 32, particularly for the purpose of carrying the hydraulic motors for operating the door-locking mechanism, all as hereinafter particularly described.

The door 16, usually made of fabricated metal, and particularly steel, is carried on arms 34, for example steel channels, pivotally mounted at 36 on the frame 10, so as to allow the door 16 and arms 34 to be moved from their loading and unloading positions shown in full lines in Fig. 1 to closed relationship with the transition section 22 as illustrated in chain-dotted lines in the same figure. The door 16 is adapted to be moved to closed or open position by any suitable means, for example, by a fluid pressure motor 38 pivotally carried by a portion of the frame 10 adapted to extend down into a pit (not shown).

Figure 3:
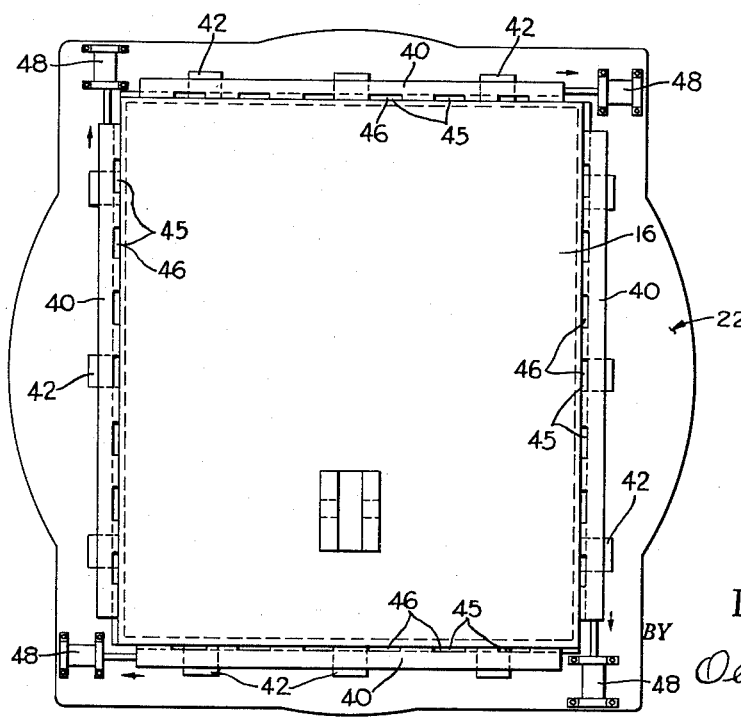
Fig. 3 is a front elevation of the apparatus of Fig. 1, and taken substantially on line III—III of Fig. 1.

The mechanism for removably locking the door 16 in closed position is best evident from Figures 1, 3, and 4, and includes C-shaped clamp bars 40 slidably mounted by the transition section 22 on machined brackets 42 secured to the transition section 22 along each side of the opening 28. Each bar 40 is formed with spaced notches or C-shaped openings 45, and the edge 44 of the door 16 is likewise formed with spaced notches or C-shaped openings 46, so that when the bars 40 are moved longitudinally by fluid motors 48 carried on the corners 32 of the transition section 22, the notches 45 and 46 are positioned either in locking or in open position. Each clamp bar 40 is provided with a shoulder 50 sliding on a flange 52 formed around the opening 28 so that the locking action and thrust on the clamp bar is taken by the square shoulder 50. A rubber gasket 54 carried by the flange 44 of the door 16 is usually employed to insure the making of fluid-tight seal between the door 16 and the body 14 of the heater.

Any number of mat molds (not shown), usually up to six or so, are adapted to be movably associated with the door 16. For example, the molds may be carried as leaves in a book all being pivotally mounted inside the heater and adapted to be opened in turn for loading and unloading. In any event, with the door 16 in the full-line open position of Fig. 1, an operator is able to service the molds lying on the door 16 in turn and substantially at waist height with respect to the operator. The fact that the door 16 is rectangular allows the operator to get in close to the molds and to most conveniently attend to the loading and unloading of the molds.

Within the concept of the invention, the door 16 may be held fixed and the body 12 of the heater may be hinged for movement to and from the door. Hence the term, "relative movement," is employed in the claim to define my invention insofar as movement between the door and heater is concerned.

It will be recognized from the foregoing that the various objects of my invention have been achieved by the provision of a relatively inexpensive autoclave or heater of the watch case or clam shell type, and wherein high operating efficiencies are obtained with a maximum of convenience and a minimum of reach insofar as loading and unloading of the heater are concerned.

While in accord with the patent statutes, I have specifically illustrated and described one best known embodiment of the invention, it is to be particularly understood that I am not to be limited thereto or thereby, but that the scope of my invention is defined in the appended claim.

I claim:

A watch-case type heater, for auto mats and the like and including a cylindrical body portion closed at one end thereof, a transition section having a circular portion secured to the open end of said body and a rectangular portion protruding therefrom and defining a rectangular opening, said rectangular portion being of maximum size to be received within the periphery of the circular portion of said transition section, flanged corners provided on the periphery of said circular portion, a rectangular door adapted to have relative movement to and from the opening, spaced lugs along each side of the door, releasable locking means along each side of the opening and operable there along for releasably locking the door in closed and sealing relation with the transition section, and at least part of said releasable locking means being carried by said flanged corners.

References Cited in the file of this patent

UNITED STATES PATENTS

| | | |
|---|---|---|
| 95,473 | Heinemann | Oct. 5, 1869 |
| 904,275 | Peckham | Nov. 17, 1908 |
| 1,226,878 | Gordon | May 22, 1917 |
| 1,901,115 | Muller | Mar. 14, 1933 |
| 1,976,833 | Brundage | Oct. 16, 1934 |
| 2,148,416 | Brundage | Feb. 21, 1939 |
| 2,290,630 | Bosomworth et al. | July 21, 1942 |
| 2,301,125 | Kramp et al. | Nov. 3, 1942 |
| 2,308,948 | Bosomworth | Jan. 19, 1943 |
| 2,623,242 | Grover | Dec. 30, 1952 |